(12) United States Patent
Shin et al.

(10) Patent No.: US 9,910,333 B2
(45) Date of Patent: Mar. 6, 2018

(54) DISPLAY DEVICE

(71) Applicant: LG DISPLAY CO., LTD., Seoul (KR)

(72) Inventors: Seungrok Shin, Goyang-si (KR); Sungho Hong, Incheon (KR); Suchang An, Seoul (KR); Leeyoung Kim, Seoul (KR); Hyangmyoung Gwon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/223,655

(22) Filed: Jul. 29, 2016

(65) Prior Publication Data

US 2017/0031524 A1 Feb. 2, 2017

(30) Foreign Application Priority Data

Jul. 29, 2015 (KR) ........................ 10-2015-0107182

(51) Int. Cl.
| | | |
|---|---|---|
| *G06F 3/041* | (2006.01) | |
| *G02F 1/1362* | (2006.01) | |
| *G06F 3/044* | (2006.01) | |
| *G09G 3/36* | (2006.01) | |
| *G02F 1/1333* | (2006.01) | |
| *G02F 1/1343* | (2006.01) | |
| *G02F 1/1368* | (2006.01) | |
| *G09G 3/20* | (2006.01) | |

(52) U.S. Cl.
CPC ...... *G02F 1/136286* (2013.01); *G02F 1/1368* (2013.01); *G02F 1/13338* (2013.01); *G02F 1/13439* (2013.01); *G02F 1/134309* (2013.01); *G06F 3/044* (2013.01); *G06F 3/0412* (2013.01); *G06F 3/0416* (2013.01); *G09G 3/2092* (2013.01); *G09G 3/3688* (2013.01); *G02F 2201/121* (2013.01); *G02F 2201/123* (2013.01); *G09G 2310/0286* (2013.01); *G09G 2310/06* (2013.01); *G09G 2310/08* (2013.01); *G09G 2320/0209* (2013.01); *G09G 2320/0223* (2013.01)

(58) Field of Classification Search
CPC .......... G06F 3/0412; G09G 2310/0286; G09G 3/3688; G09G 3/2092; G09G 2310/08; G02F 2201/121; G02F 1/13338; G02F 1/134309; G02F 1/136286

See application file for complete search history.

(56) References Cited

U.S. PATENT DOCUMENTS

| | | | |
|---|---|---|---|
| 9,024,913 B1* | 5/2015 | Jung | G06F 3/044 178/18.06 |
| 2015/0146468 A1* | 5/2015 | Cho | H02M 7/5387 363/131 |
| 2015/0365001 A1* | 12/2015 | Klesyk | H02M 1/08 363/21.01 |

\* cited by examiner

*Primary Examiner* — Abbas Abdulselam
(74) *Attorney, Agent, or Firm* — Dentons US LLP

(57) ABSTRACT

A display device comprising a display panel having touch sensors and gate lines, a touch sensor driver configured to supply a touch driving signal to the touch sensors of the display panel during a touch sensor driving period, a gate driver configured to supply a gate pulse synchronized with a data voltage of an input image to the gate lines of the display panel during a display driving period and supply an alternating current (AC) signal having a same phase as the touch driving signal to the gate lines during the touch sensor driving period, and a modulator configured to supply the AC signal having the same phase as the touch driving signal to the gate driver during the touch sensor driving period.

14 Claims, 14 Drawing Sheets

FIG. 11A

| Tsync | PWM_Tx(VGH) | VGH_Out |
|---|---|---|
| 0 | 0 | VGH(L) |
| 0 | 1 | VGH(H) |
| 1 | - | VGH |

FIG. 11B

| Tsync | PWM_Tx(VGL) | VGL_Out |
|---|---|---|
| 0 | 0 | VGL(L) |
| 0 | 1 | VGL(H) |
| 1 | - | VGL |

| Tsync | PWM_Tx(VGL) | MVSS |
|---|---|---|
| 0 | 0 | VGL(L) |
| 0 | 1 | VGL(H) |
| 1 | – | VGL |

DISPLAY DEVICE

This application claims the benefit of Korean Patent Application No. 10-2015-0107182 filed on Jul. 29, 2015, which is incorporated herein by reference for all purposes as if fully set forth herein.

BACKGROUND

Field

The present disclosure relates to a display device in which touch sensors are embedded in a pixel array.

Discussion of the Related Art

User interfaces (UIs) are configured to allow users to communicate with various electronic devices, and thus to easily and comfortably control the electronic devices as they desire. Examples of UIs include a keypad, a keyboard, a mouse, an on-screen display (OSD), and a remote controller having an infrared communication function or a radio frequency (RF) communication function. User interface technology has continuously expanded to increase user's sensibility and handling convenience. UIs have been recently developed to include touch UIs, voice recognition UIs, 3D UIs, and the like.

The touch UI has been essentially adopted in portable information devices, such as smart phones, and use of the touch UI has been expanded to include notebook computers, computer monitors, and home appliances. A technology (hereinafter referred to as "in-cell touch sensor technology") has been recently proposed to embed touch sensors in a pixel array of a display panel. In in-cell touch sensor technology, touch sensors may be installed in a display panel without an increase in a thickness of the display panel. The touch sensors are connected to pixels through parasitic capacitances. In order to reduce a mutual influence and crosstalk attributable to coupling between the pixels and the touch sensors, one frame period may be time-divided into a period (hereinafter referred to as "display driving period") in which the pixels are driven, and a period (hereinafter referred to as a "touch sensor driving period") in which the touch sensors are driven.

In in-cell touch sensor technology, electrodes connected to the pixels of the display panel are used as electrodes of the touch sensors. For example, a common electrode supplying a common voltage to pixels of a liquid crystal display is segmented, and segmented common electrode patterns are used as electrodes of the touch sensors.

A parasitic capacitance connected to the in-cell touch sensors increases due to coupling between the in-cell touch sensors and the pixels. When the parasitic capacitance increases, the possibility of crosstalk increases and touch sensitivity and accuracy of touch recognition are deteriorated. When an alternating current (AC) signal having the same phase as a touch driving signal is supplied to gate lines of the display panel during a touch sensor driving period, the parasitic capacitance of the touch sensor may decrease. This method supplies a gate pulse synchronized with a data voltage of an input image to the gate lines during the display driving period and supplies the AC signal to the gate lines during the touch sensor driving period.

To this end, a power generator produces the AC signal during the touch sensor driving period and supplies the AC signal to a low potential input terminal of a gate driver, and the gate driver supplies the AC signal supplied to the low potential input terminal to an output node through a low potential signal line. However, because the low potential signal line inside the gate driver is coupled with a plurality of thin film transistors (TFTs) through the parasitic capacitance, a waveform of the AC signal supplied to the output node is distorted by an influence of an RC delay. Hence, the AC signal applied to the gate lines of the display panel and the touch driving signal are out of phase with each other. As a result, the related art has the disadvantage of a limit in a reduction in the parasitic capacitance between the touch sensor and the gate line during the touch sensor driving period.

SUMMARY

The present disclosure provides a display device capable of minimizing distortion of an alternating current (AC) signal supplied to gate lines during a touch sensor driving period.

BRIEF DESCRIPTION OF THE DRAWINGS

The accompanying drawings are included to provide a further understanding of the invention and are incorporated in and constitute a part of this specification. These drawings illustrate embodiments of the invention and together with the description serve to explain the principles of the invention. In the drawings:

FIGS. 11A and 11B illustrate control signals according to a first embodiment of the invention and an output state of a modulator shown in FIG. 10 in response to the control signals;

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. Detailed descriptions of known arts will be omitted if such may mislead the embodiments of the invention.

A display device according to embodiments of the invention may be implemented as a flat panel display, such as a liquid crystal display (LCD), a field emission display (FED), a plasma display panel (PDP), an organic light emitting diode display, and an electrophoresis display (EPD). In the following description, embodiments of the invention will be described using a liquid crystal display as an example of a flat panel display. However, embodiments of the invention are not limited thereto, and other flat panel displays may be used. For example, a display device according to embodiments of the invention may be implemented as any display device, to which an in-cell touch sensor technology is applicable.

Figure 1:
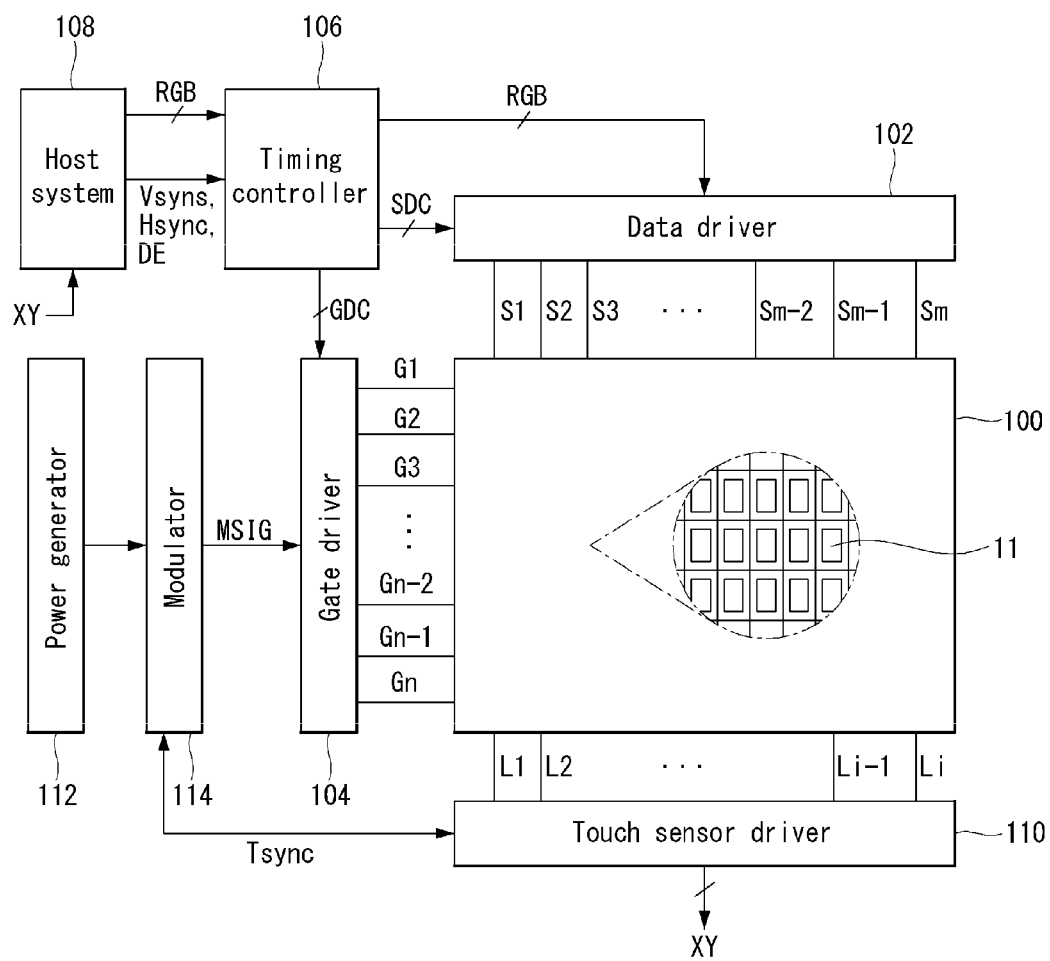
FIG. 1 is a block diagram schematically illustrating a display device according to an exemplary embodiment of the invention.
Figure 2:
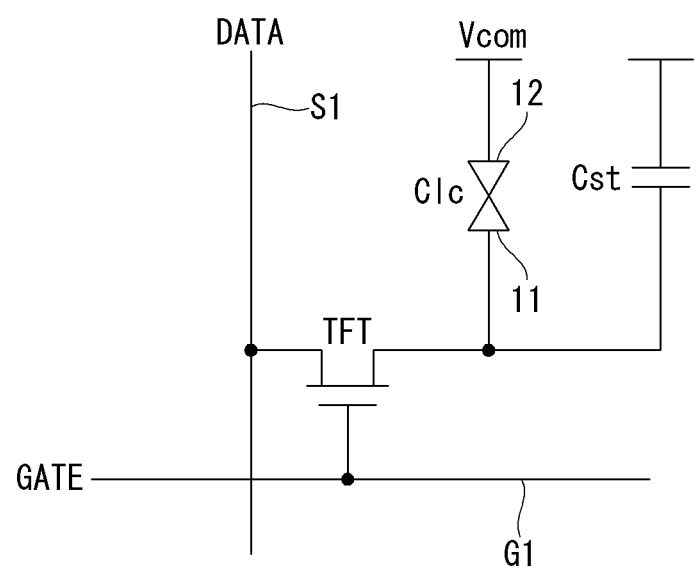
FIG. 2 is an equivalent circuit diagram illustrating a pixel of a liquid crystal display.
Figure 3:
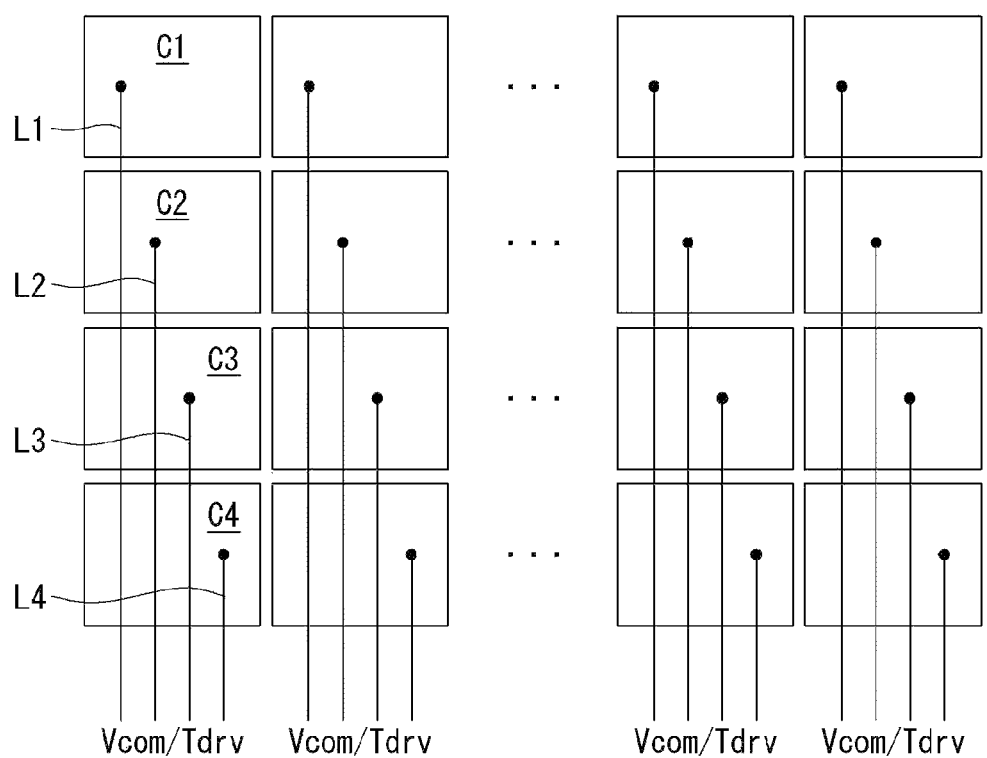
FIG. 3 illustrates a self-capacitance touch sensor.
Figure 4:
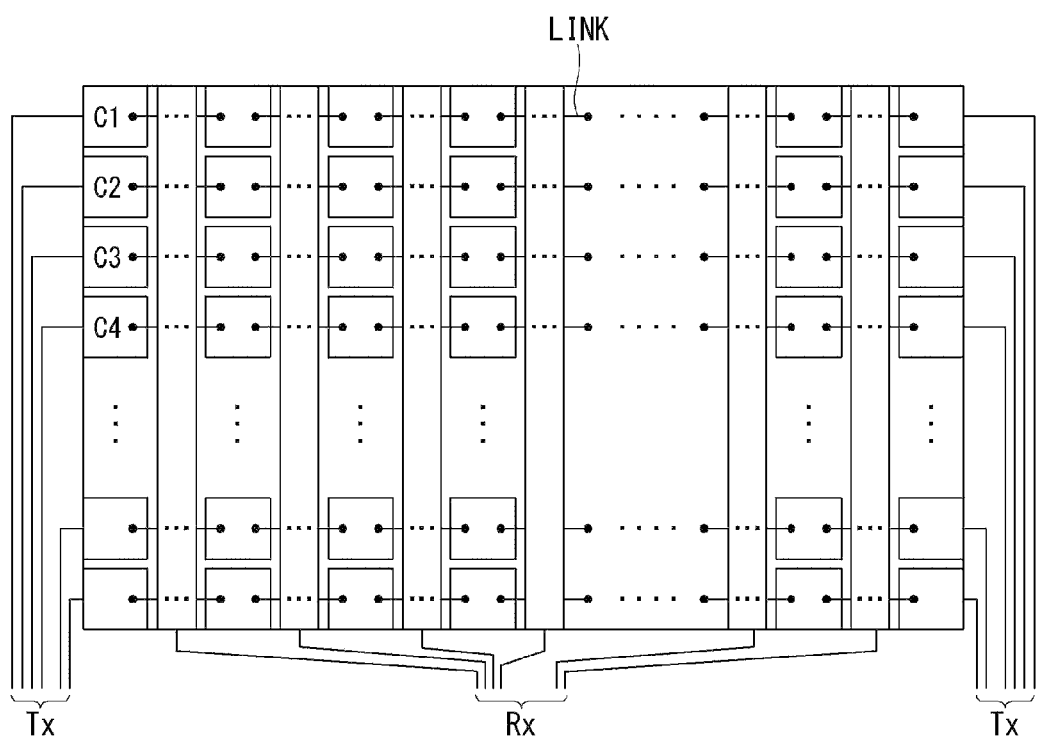
FIG. 4 illustrates a mutual capacitance touch sensor.
Figure 5:
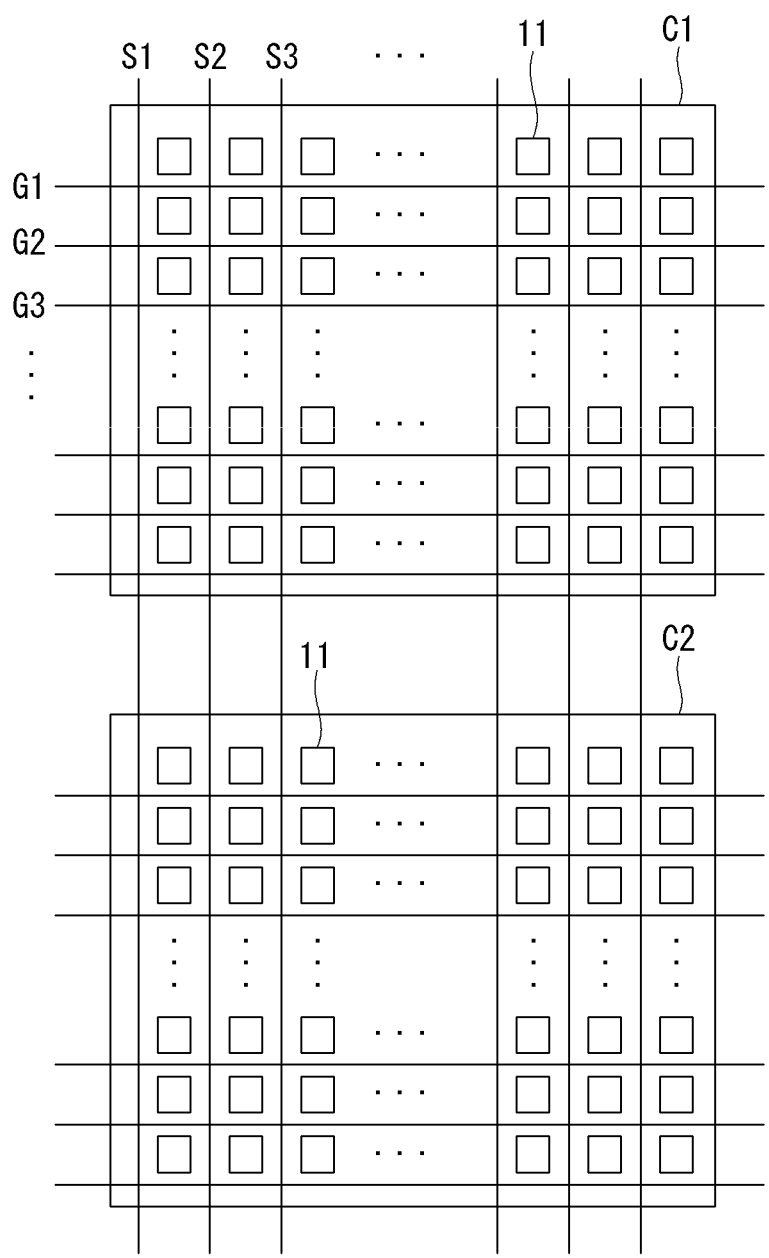
FIG. 5 enlargedly illustrates an electrode pattern of an in-cell touch sensor.
Figure 6:
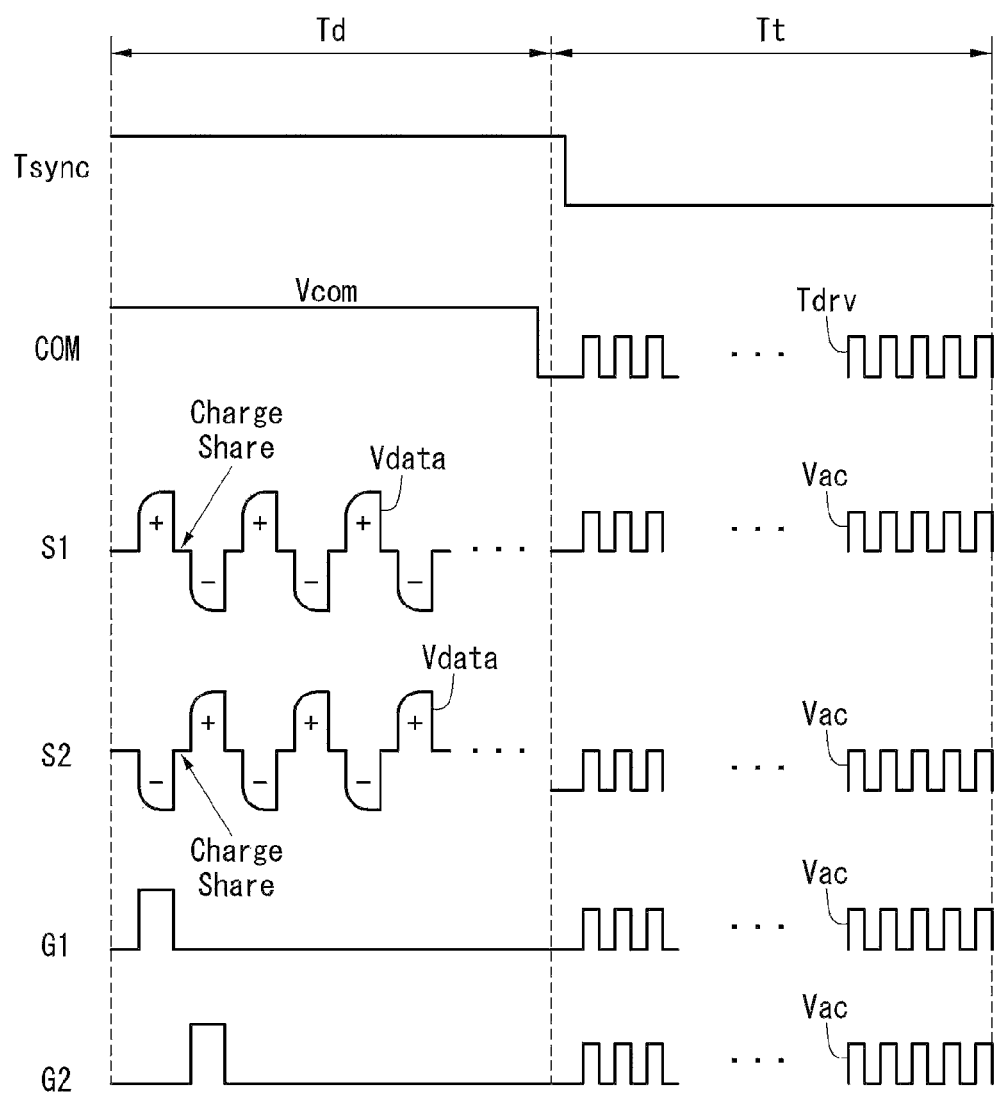
FIG. 6 is a waveform diagram illustrating signals supplied to an in-cell touch sensor, data lines, and gate lines in a display driving period and a touch sensor driving period in accordance with a time-division drive.

FIGS. 1 and 2 illustrate a display device according to an exemplary embodiment of the invention. FIGS. 3 and 4 illustrate electrode patterns of touch sensors. FIG. 5 enlargedly illustrates an electrode pattern of an in-cell touch sensor. FIG. 6 is a waveform diagram illustrating signals supplied to an in-cell touch sensor, data lines, and gate lines in a display driving period and a touch sensor driving period in accordance with a time-division drive.

Referring to FIGS. 1 to 6, a display device according to an exemplary embodiment of the invention includes in-cell touch sensors. The in-cell touch sensors are embedded in a pixel array and sense a touch input.

The display device according to the embodiment of the invention includes a pixel array in which in-cell touch sensors are embedded. The display device includes a time-division drive in a display driving period and a touch sensor driving period. During the display driving period, data of an input image is applied to the pixel array. During the touch sensor driving period, the in-cell touch sensors are driven and sense a touch input.

The in-cell touch sensors may be implemented as capacitive touch sensors. For example, a common electrode 12 may be segmented into in-cell touch sensors C1 to C4. A capacitance of the in-cell touch sensors C1 to C4 may be measured as a self-capacitance or a mutual capacitance. As shown in FIG. 3, in self-capacitance in-cell touch sensors C1 to C4, sensor lines L1 to L4 are respectively connected to the self-capacitance in-cell touch sensors C1 to C4. As shown in FIG. 4, in mutual capacitance in-cell touch sensors C1 to C4, sensor lines are separated into Tx lines and Rx lines crossing the Tx lines. The Tx lines and the Rx lines are combined through the mutual capacitance. Separated Tx line patterns are connected through link patterns LINK and constitute the Tx line. The link patterns LINK are separated from the Rx lines through an insulating layer.

A common voltage Vcom is supplied to the in-cell touch sensors C1 to C4 during the display driving period, and a touch driving signal Tdrv (for example, an alternating current (AC) signal) is supplied to the in-cell touch sensors C1 to C4 during the touch sensor driving period. The common voltage Vcom is, for example, a reference voltage applied to pixels of a liquid crystal display. However, embodiments of the invention are not limited thereto, and other voltages may be used. For example, the common voltage Vcom may be a high potential power voltage VDD or a low potential power voltage VSS commonly applied to the pixels of organic light emitting diode displays. The common voltage Vcom should be interpreted as a voltage commonly supplied to pixels of flat panel displays.

In a liquid crystal display of one embodiment, a display panel 100 includes a liquid crystal layer between an upper substrate and a lower substrate. Liquid crystal molecules of the liquid crystal layer are driven by an electric field generated by a difference between a data voltage of an input image applied to a pixel electrode 11 and the common voltage Vcom applied to the common electrode 12. A pixel array of the display panel 100 includes pixels defined by data lines S1 to Sm and gate lines G1 to Gn, in-cell touch sensors C1 to C4 segmented from the common electrode 12, and sensor lines connected to the in-cell touch sensors C1 to C4, where m and n are a positive integer. In the embodiment disclosed herein, the sensor lines may be the sensor lines L1 to L4 shown in FIG. 3 and the Tx lines and the Rx lines shown in FIG. 4. Each of the pixel electrodes 11 and the segmented common electrodes 12 may be formed of a transparent conductive material, for example, indium tin oxide (ITO).

Each pixel includes pixel thin film transistors (TFTs) formed at crossings of the data lines S1 to Sm and the gate lines G1 to Gn, the pixel electrode 11 supplied with the data voltage through the pixel TFT, the common electrode 12 supplied with the common voltage Vcom, a storage capacitor Cst which is connected to the pixel electrode 11 and holds a voltage of a liquid crystal cell, and the like. The in-cell touch sensors C1 to C4 and the sensor lines connected to the in-cell touch sensors C1 to C4 serve as the common electrode during the display driving period. As shown in FIG. 5, each of the in-cell touch sensors C1 to C4 is connected to the pixels.

Black matrixes, color filters, etc. may be formed on the upper substrate of the display panel 100. The lower substrate of the display panel 100 may be configured in a COT (color filter on TFT) structure. In this instance, the color filters may be formed on the lower substrate of the display panel 100. Polarizing plates are respectively attached to the upper substrate and the lower substrate of the display panel 100. Alignment layers for setting a pre-tilt angle of liquid crystals are respectively formed on the inner surfaces contacting the liquid crystals in the upper substrate and the lower substrate of the display panel 100. A column spacer is formed between the upper substrate and the lower substrate of the display panel 100 to keep a cell gap of the liquid crystal layer constant.

A backlight unit may be disposed under a back surface of the display panel 100. The backlight unit may be implemented as one of an edge type backlight unit and a direct type backlight unit and irradiates light onto the display panel 100. The display panel 100 may be implemented in any known mode including a twisted nematic (TN) mode, a vertical alignment (VA) mode, an in-plane switching (IPS) mode, a fringe field switching (FFS) mode, etc. The backlight unit is not necessary in a self-emission display such as an organic light emitting diode display.

The display device according to the embodiment of the invention further includes a display driver applying a data signal of the input image to the pixels, a touch sensor driver 110 driving the touch sensors, and a modulator 114 which processes a power voltage to generate a modulation signal MSIG.

The display driver includes a data driver 102, a gate driver 104, and a timing controller 106.

As shown in FIG. 6, a driving period of the display device according to the embodiment of the invention is time-divided into a display driving period Td and a touch sensor driving period Tt. The display driver and the touch sensor driver 110 are synchronized with each other in response to a synchronization signal Tsync. A first logic level of the synchronization signal Tsync defines the display driving period Td, and a second logic level of the synchronization signal Tsync defines the touch sensor driving period Tt. As shown in FIG. 6, the first logic level is a high logic level, and the second logic level is a low logic level, or vice versa, although embodiments are not limited thereto. In FIG. 6, "COM" denotes waveform of a signal applied to the in-cell touch sensors.

The display driver applies data of an input image to the pixels during the display driving period Td. The pixels hold the data voltage which has been charged to the pixels during the display driving period Td because the pixel TFTs are in an off-state during the touch sensor driving period Tt. The display driver supplies an AC signal Vac having the same phase as a touch driving signal Tdry to the data lines S1 to Sm and gate lines G1 to Gn so as to minimize a parasitic capacitance, during the touch sensor driving period Tt, between the touch sensors and the signal lines S1 to Sm and gate lines G1 to Gn connected to the pixels during the touch sensor driving period Tt.

During the display driving period Td, the data driver 102 converts digital video data RGB of the input image received from the timing controller 106 into positive and negative analog gamma compensation voltages and outputs a data voltage. The data driver 102 then supplies the data voltage to the data lines S1 to Sm.

During the touch sensor driving period Tt, the data driver 102 supplies the AC signal Vac having the same phase and the same amplitude as the touch driving signal Tdry applied to the in-cell touch sensors C1 to C4 to the data lines S1 to Sm, thereby minimizing a parasitic capacitance between the in-cell touch sensors C1 to C4 and the data lines S1 to Sm. This is because voltages at both ends of the parasitic capacitance simultaneously change, and an amount of charges charged to the parasitic capacitance decreases as a voltage difference between both ends of the parasitic capacitance decreases. Namely, since Q=CV, Q decreases as V decreases. During the touch sensor driving period Tt, the data driver 102 may supply the AC signal Vac to the data lines S1 to Sm in a state where the data lines S1 to Sm are connected to one another.

During the display driving period Td, the gate driver 104 sequentially supplies a gate pulse (or a scan pulse) synchronized with the data voltage to the gate lines G1 to Gn and selects lines of the display panel 100, to which the data voltage is applied. The gate pulse swings between a gate high voltage VGH and a gate low voltage VGL received from the modulator 114. The gate pulse is applied to the pixel TFTs through the gate lines G1 to Gn. The gate high voltage VGH is set to a voltage greater than a threshold voltage of the pixel TFT and turns on the pixel TFT. The gate low voltage VGL is set to a voltage less than the threshold voltage of the pixel TFT.

During the touch sensor driving period Tt, the gate driver 104 supplies the AC signal Vac, having the same phase and the same amplitude as the touch driving signal Tdry applied to the touch sensors, to the gate lines G1 to Gn during the touch sensor driving period Tt, thereby minimizing a parasitic capacitance between the touch sensors and the gate lines G1 to Gn. A voltage of the AC signal Vac supplied to the gate lines G1 to Gn during the touch sensor driving period Tt is less than the gate high voltage VGH and is less than the threshold voltage of the pixel TFT, so that data applied to the pixels does not change.

The modulator 114 receives a power voltage from a power generator 112. During the display driving period Td, the modulator 114 produces a high potential power, a low potential power, a clock signal, a start signal, etc. using the gate high voltage VGH and the gate low voltage VGL generated in the power generator 112 and supplies them to the gate driver 104.

During the touch sensor driving period Tt, the modulator 114 processes the gate high voltage VGH and the gate low voltage VGL received from the power generator 112 to produce the modulation signal MSIG, i.e., the AC signal Vac and supplies the AC signal Vac to one of an input terminal and an output terminal of the gate driver 104. Hence, the modulator 114 can minimize the distortion of the AC signal Vac supplied to the gate lines G1 to Gn. This is described in detail later with reference to FIGS. 7 to 15.

The timing controller 106 receives timing signals, such as a vertical sync signal Vsync, a horizontal sync signal Hsync, and a data enable signal DE, from a host system 108 and controls operation timings of the data driver 102 and the gate driver 104. The timing controller 106 generates a scan timing control signal GDC to control the operation timing of the gate driver 104 and generates a data timing control signal SDC to control the operation timing of the data driver 102.

The host system 108 may be implemented as one of a phone system, a television system, a set-top box, a navigation system, a DVD player, a Blu-ray player, a personal computer (PC), and a home theater system. The host system 108 includes a system on chip (SoC), in which a scaler is embedded, and converts the digital video data RGB of the input image into a format suitable for a resolution of the display panel 100. The host system 108 transmits the digital video data RGB of the input image and the timing signals Vsync, Hsync, and DE to the timing controller 106. Further, the host system 108 executes an application associated with coordinate information XY of a touch input received from the touch sensor driver 110.

The timing controller 106 or the host system 108 may generate the synchronization signal Tsync for synchronizing the display driver with the touch sensor driver 110.

During the touch sensor driving period Tt, the touch sensor driver 110 supplies the touch driving signal Tdry to the in-cell touch sensors C1 to C4. When a conductive material, for example, a finger approaches the in-cell touch sensor, an amount of charges of a capacitance varies. The touch sensor driver 110 measures a change amount of charges of the in-cell touch sensor and senses a touch location and a touch area. The touch sensor driver 110 calculates coordinate information XY of each touch input and transmits the calculated coordinate information XY to the host system 108.

The data driver 102 and the touch sensor driver 110 may be integrated into one driver integrated circuit (IC). The driver IC may be attached to the substrate of the display panel 100 through a chip-on-glass (COG) process.

Figure 7:
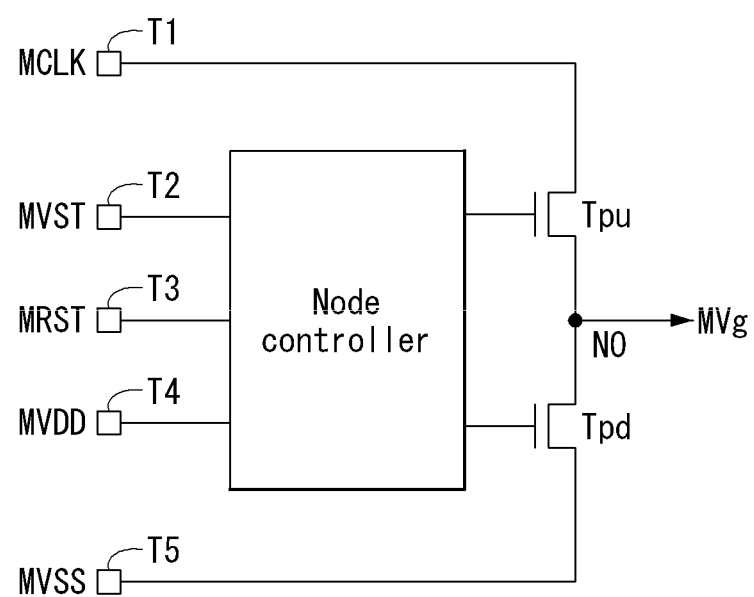
FIG. 7 schematically illustrates one configuration of a gate driver according to a first embodiment of the invention.
Figure 8:
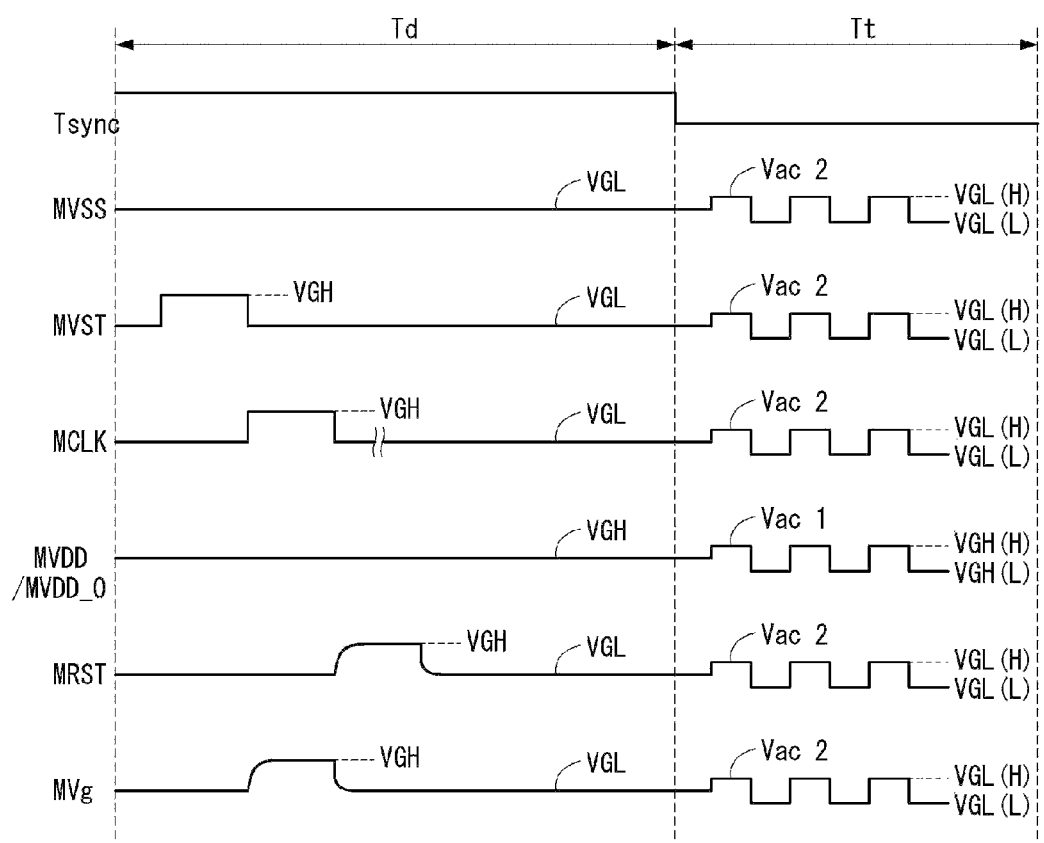
FIG. 8 is a waveform diagram illustrating modulation signals applied to input terminals of a gate driver shown in FIG. 7 in accordance with a first embodiment of the invention.
Figure 9:
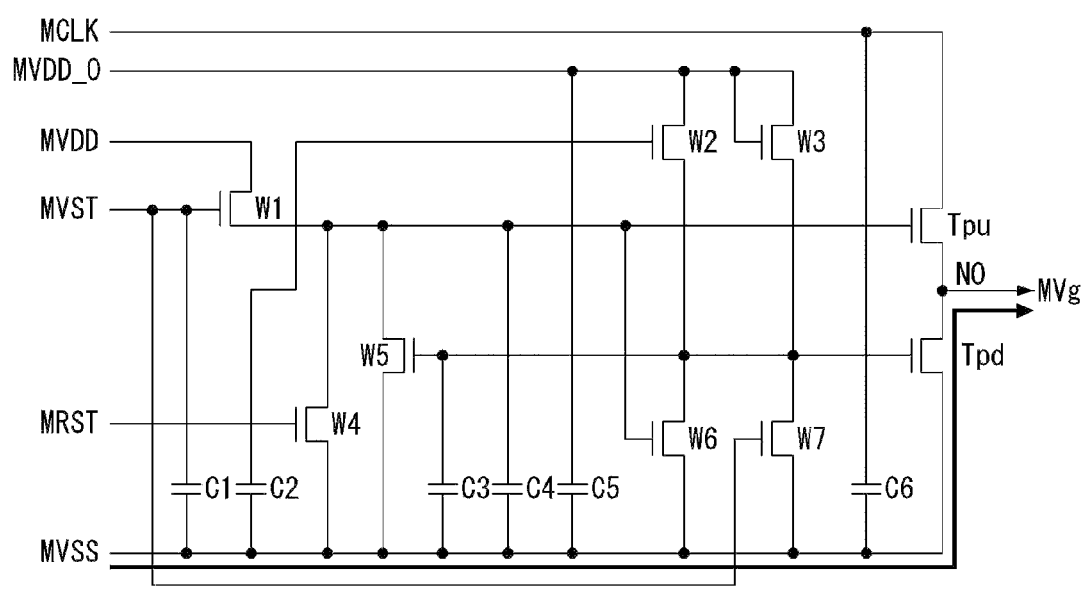
FIG. 9 illustrates that a parasitic capacitance between a low potential signal line and other input terminals of a gate driver is minimized, when a first embodiment of the invention is applied.

FIG. 7 schematically illustrates a configuration of a gate driver according to a first embodiment of the invention. FIG. 8 is a waveform diagram illustrating modulation signals applied to input terminals of a gate driver shown in FIG. 7 in accordance with the first embodiment of the invention. FIG. 9 illustrates that a parasitic capacitance between a low potential signal line and other input terminals of a gate driver is minimized, when the first embodiment of the invention is applied.

Referring to FIGS. 7 and 8, a gate driver 104 includes a plurality of gate stages each including a node controller, a pull-up switch Tpu, and a pull-down switch Tpd. An output node NO of each gate stage is connected to one of the gate lines G1 to Gn, and a gate output signal MVg is supplied to the corresponding gate line through the output node NO. The gate output signal MVg includes a gate pulse supplied during a display driving period Td and an AC signal supplied during a touch sensor driving period Tt.

To this end, during the display driving period Td, a modulator 114 supplies a clock signal MCLK swinging between a gate high voltage VGH and a gate low voltage VGL to a clock input terminal T1 of the gate driver 104, supplies a start signal MVST swinging between the gate high voltage VGH and the gate low voltage VGL to a start input terminal T2 of the gate driver 104, supplies a high potential power MVDD or MVDD_O of the gate high voltage VGH to a high potential input terminal T4 of the gate driver 104, and supplies a low potential power MVSS of the gate low voltage VGL to a low potential input terminal T5 of the gate driver 104. During the display driving period Td, a gate pulse of a subsequent gate stage, as a reset signal MRST, is supplied to a reset input terminal T3 of the gate driver 104.

As shown in FIG. 8, during the touch sensor driving period Tt, the modulator 114 supplies a first AC signal Vac1 swinging between a first gate high voltage VGH(H) and a second gate high voltage VGH(L) to the high potential input terminal T4 of the gate driver 104 and supplies a second AC signal Vac2 swinging between a first gate low voltage VGL(H) and a second gate low voltage VGL(L) to each of the clock input terminal T1, the start input terminal T2, the reset input terminal T3, and the low potential input terminal T5 of the gate driver 104. In the embodiment disclosed herein, the first gate high voltage VGH(H) is equal to or greater than the gate high voltage VGH, and the second gate high voltage VGH(L) is equal to or less than the gate high voltage VGH. The first gate low voltage VGL(H) is equal to or greater than the gate low voltage VGL, and the second gate low voltage VGL(L) is equal to or less than the gate low voltage VGL. An amplitude between the first gate high voltage VGH(H) and the second gate high voltage VGH(L) and an amplitude between the first gate low voltage VGL(H) and the second gate low voltage VGL(L) are substantially equal to an amplitude of a touch driving signal Tdrv.

The node controller shown in FIG. 7 may be implemented as a plurality of TFTs W1 to W7 as shown in FIG. 9. A low potential signal line connected to the low potential input terminal T5 is coupled with the TFTs W1 to W7 through a plurality of parasitic capacitances C1 to C6. The embodiment of the invention supplies the AC signal to the high potential input terminal T4, the clock input terminal T1, the start input terminal T2, and the reset input terminal T3 as well as the low potential input terminal T5 of the gate driver 104, so as to prevent the AC signal applied to an output node NO of the gate driver 104 from being distorted by an influence of an RC delay resulting from the coupling during the touch sensor driving period Tt. Hence, the embodiment of the invention can minimize the parasitic capacitances C1 to C6 between the low potential signal line and the TFTs W1 to W7. This is because voltages at both ends of each of the parasitic capacitances C1 to C6 simultaneously change, and an amount of charges charged to the parasitic capacitances C1 to C6 decreases as a voltage difference between both ends of each of the parasitic capacitances C1 to C6 decreases.

Figure 10:
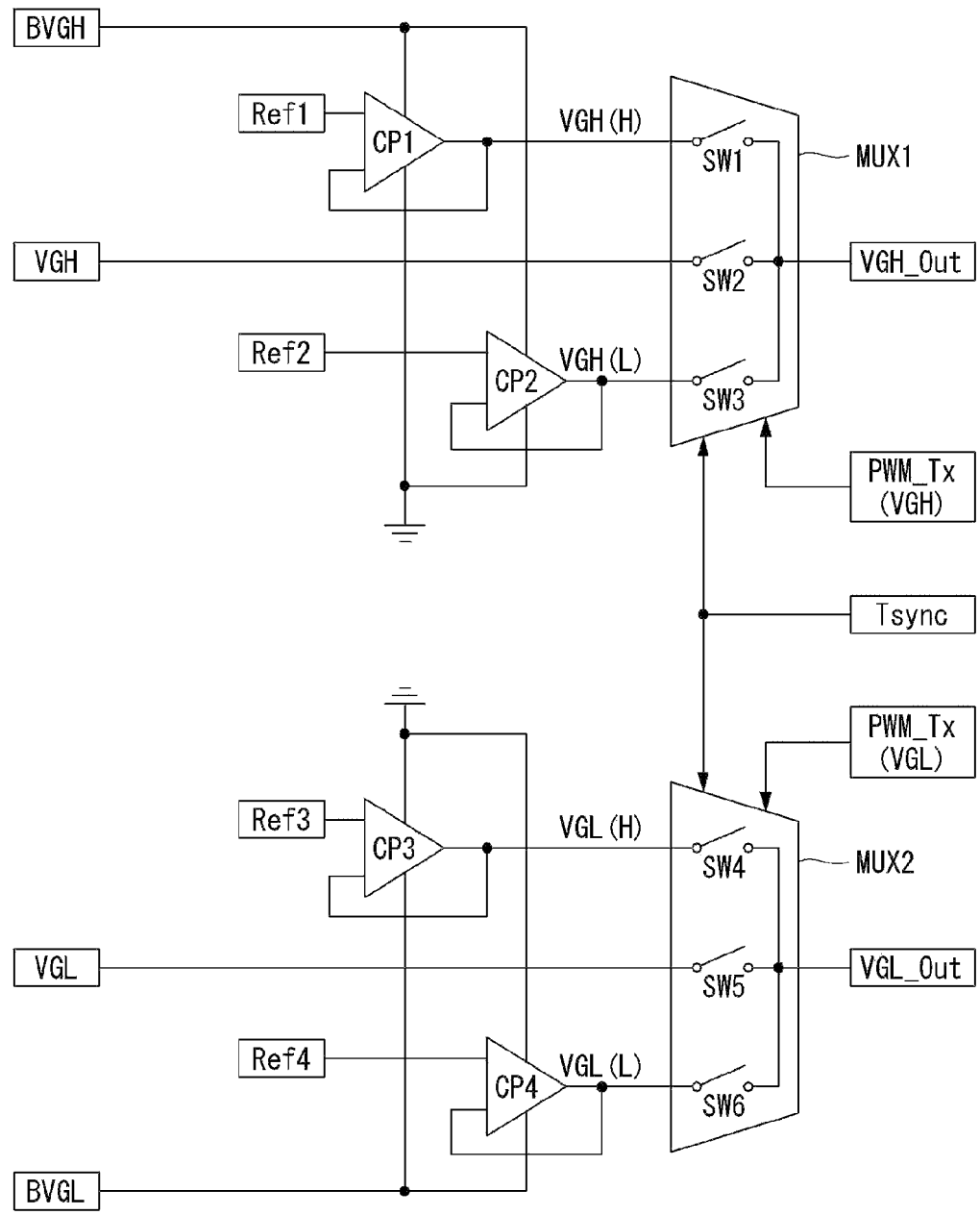
FIG. 10 illustrates configuration of a modulator producing modulation signals shown in FIG. 8 in accordance with a first embodiment of the invention.

FIG. 10 illustrates configuration of a modulator producing modulation signals shown in FIG. 8 in accordance with the first embodiment of the invention. FIGS. 11A and 11B illustrate control signals according to the first embodiment of the invention and an output state of a modulator shown in FIG. 10 in response to the control signals.

Referring to FIG. 10, the modulator 114 includes first and second comparators CP1 and CP2 operating in accordance with a first bias voltage BVGH, a first selector MUX1 connected to the first and second comparators CP1 and CP2, third and fourth comparators CP3 and CP4 operating in accordance with a second bias voltage BVGL, and a second selector MUX2 connected to the third and fourth comparators CP3 and CP4.

The first comparator CP1 generates the first gate high voltage VGH(H) to be equal to or greater than the gate high voltage VGH based on a first reference voltage Vref1 and supplies the first gate high voltage VGH(H) to the first selector MUX1. The second comparator CP2 generates the second gate high voltage VGH(L) to be equal to or less than the gate high voltage VGH based on a second reference voltage Vref2 and supplies the second gate high voltage VGH(L) to the first selector MUX1.

During the touch sensor driving period Tt, the first selector MUX1 alternately outputs the first gate high voltage VGH(H) and the second gate high voltage VGH(L) and produces the first AC signal Vac1 having the same amplitude as the touch driving signal Tdrv. On the other hand, the first selector MUX1 outputs the gate high voltage VGH during the display driving period Td.

To this end, as shown in FIG. 11A, the first selector MUX1 includes first to third switches SW1 to SW3, which are selectively turned on in response to a synchronization signal Tsync and a first auxiliary control signal PWM_Tx (VGH). In the display driving period Td, the synchronization signal Tsync has a first logic level "1", and the second switch SW2 is turned on outputs the gate high voltage VGH. In the touch sensor driving period Tt, the synchronization signal Tsync has a second logic level "0," and the first and third switches SW1 and SW3 are selectively turned on in response to the first auxiliary control signal PWM_Tx (VGH). When the synchronization signal Tsync has the second logic level "0" and the first auxiliary control signal PWM_Tx(VGH) has the first logic level "1", the first switch SW1 is turned on and outputs the first gate high voltage VGH(H). When the synchronization signal Tsync has the second logic level "0" and the first auxiliary control signal PWM_Tx(VGH) has the second logic level "0", the third switch SW3 is turned on and outputs the second gate high voltage VGH(L).

The third comparator CP3 generates the first gate low voltage VGL(H) to be equal to or greater than the gate low voltage VGL based on a third reference voltage Vref3 and supplies the first gate low voltage VGL(H) to the second selector MUX2. The fourth comparator CP4 generates the second gate low voltage VGL(L) to be equal to or less than the gate low voltage VGL based on a fourth reference voltage Vref4 and supplies the second gate high voltage VGH(L) to the second selector MUX2.

During the touch sensor driving period Tt, the second selector MUX2 alternately outputs the first gate low voltage VGL(H) and the second gate low voltage VGL(L) and produces the second AC signal Vac2 having the same amplitude as the touch driving signal Tdrv. On the other hand, the second selector MUX2 outputs the gate low voltage VGL during the display driving period Td.

To this end, as shown in FIG. 11B, the second selector MUX2 includes fourth to sixth switches SW4 to SW6, which are selectively turned on in response to the synchronization signal Tsync and a second auxiliary control signal PWM_Tx(VGL). In the display driving period Td, the synchronization signal Tsync has a first logic level "1", and the fifth switch SW5 is turned on and outputs the gate low voltage VGL. In the touch sensor driving period Tt, the synchronization signal Tsync has a second logic level "0," and the fourth and sixth switches SW4 and SW6 are selectively turned on in response to the second auxiliary control signal PWM_Tx(VGL). When the synchronization signal Tsync has the second logic level "0" and the second auxiliary control signal PWM_Tx(VGL) has the first logic level "1", the fourth switch SW4 is turned on and outputs the first gate low voltage VGL(H). When the synchronization signal Tsync has the second logic level "0" and the second auxiliary control signal PWM_Tx(VGL) has the second logic level "0", the sixth switch SW6 is turned on and outputs the second gate low voltage VGL(L).

Figure 12:
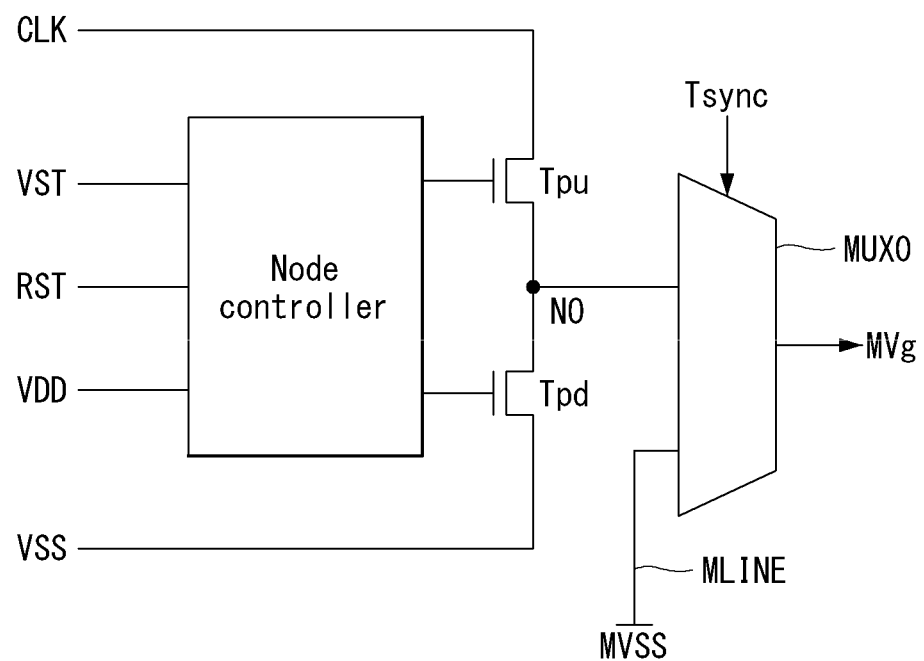
FIG. 12 illustrates configuration of an output terminal of a gate driver connected to a modulation signal supply line in accordance with a second embodiment of the invention.
Figure 13:
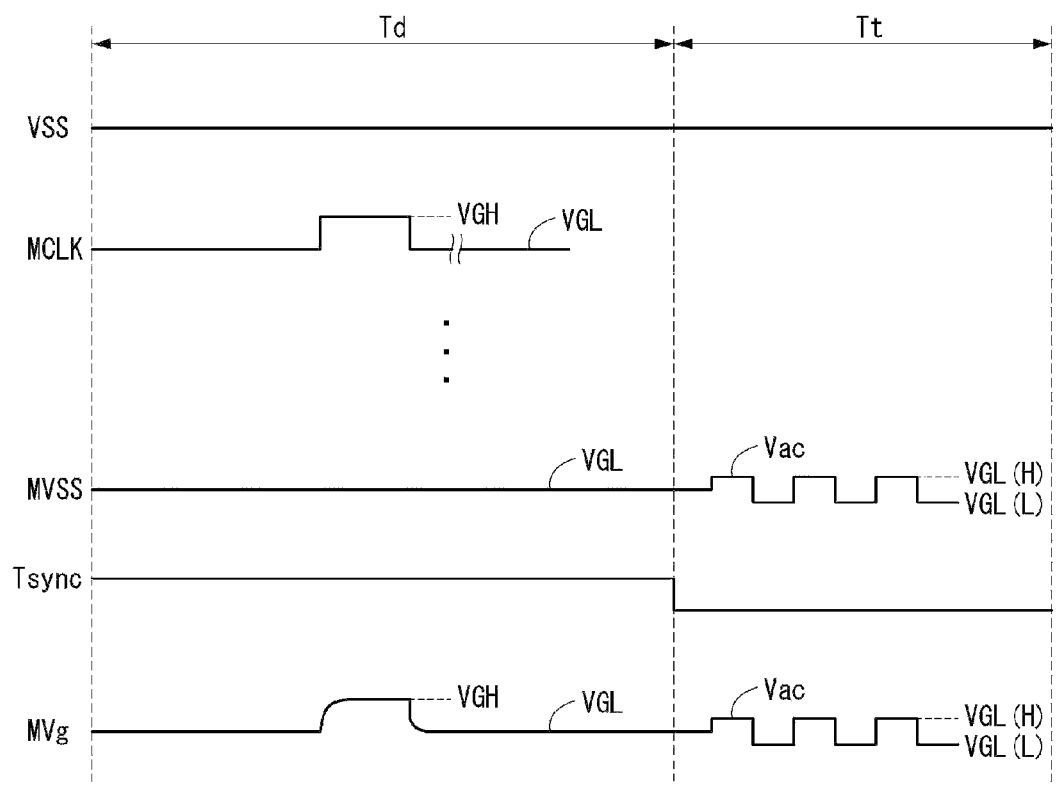
FIG. 13 is a waveform diagram illustrating a modulation signal applied to a modulation signal supply line shown in FIG. 12 in accordance with a second embodiment of the invention.

FIG. 12 illustrates configuration of an output terminal of a gate driver connected to a modulation signal supply line in accordance with a second embodiment of the invention. FIG. 13 is a waveform diagram illustrating a modulation signal applied to a modulation signal supply line shown in FIG. 12 in accordance with the second embodiment of the invention.

Referring to FIGS. 12 and 13, a gate driver 104 includes a plurality of gate stages each including a node controller, a pull-up switch Tpu, and a pull-down switch Tpd. An output node NO of each gate stage is connected to one of the gate lines G1 to Gn, and a gate output signal MVg is supplied to the corresponding gate line through the output node NO. The gate output signal MVg includes a gate pulse supplied during a display driving period Td and an AC signal supplied during a touch sensor driving period Tt.

During the touch sensor driving period Tt, a modulator 114 directly supplies an AC signal to an output terminal of the gate driver 104 through a modulation signal supply line MLINE positioned outside the gate driver 104. The AC signal is supplied through the separate modulation signal supply line MLINE without passing through a low potential signal line of the gate driver 104. Therefore, because the AC signal is not affected by a coupling inside the gate driver 104, a distortion of the AC signal can be minimized.

The output terminal of the gate driver 104 includes an output selector MUXO which selectively outputs the gate pulse received from the output node NO of the gate stage and the AC signal received from the modulation signal supply line MLINE.

During the touch sensor driving period Tt, the modulator 114 supplies an AC signal Vac swinging between a first gate low voltage VGL(H) and a second gate low voltage VGL(L) to the output terminal of the gate driver 104 via the modulation signal supply line MLINE. In the embodiment disclosed herein, the first gate low voltage VGL(H) is equal to or greater than a gate low voltage VGL, and the second gate low voltage VGL(L) is equal to or less than the gate low voltage VGL. An amplitude between the first gate low voltage VGL(H) and the second gate low voltage VGL(L) is substantially equal to an amplitude of a touch driving signal Tdrv.

Figures 14, 15:
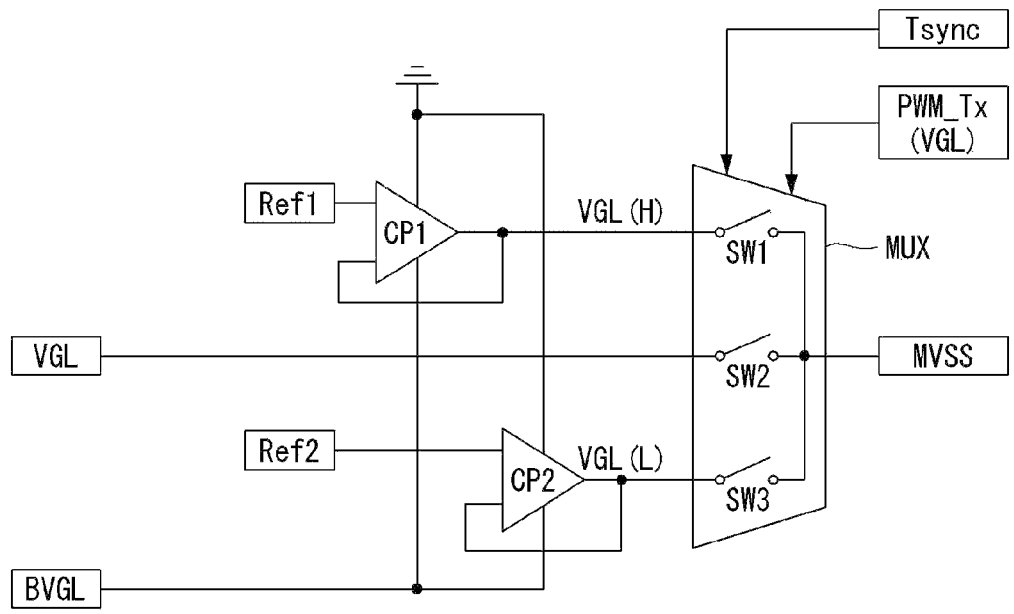
FIG. 14 illustrates configuration of a modulator producing a modulation signal shown in FIG. 13 in accordance with a second embodiment of the invention.
FIG. 15 illustrates control signals according to a second embodiment of the invention and an output state of a modulator shown in FIG. 14 in response to the control signals.

FIG. 14 illustrates configuration of a modulator producing a modulation signal shown in FIG. 13 in accordance with the second embodiment of the invention. FIG. 15 illustrates control signals according to the second embodiment of the invention and an output state of a modulator shown in FIG. 14 in response to the control signals.

Referring to FIG. 14, the modulator 114 includes first and second comparators CP1 and CP2 operating in accordance with a bias voltage BVGL, and a selector MUX connected to the first and second comparators CP1 and CP2.

The first comparator CP1 generates the first gate low voltage VGL(H) equal to or greater than the gate low voltage VGL based on a first reference voltage Vref1 and supplies the first gate low voltage VGL(H) to the selector MUX. The second comparator CP2 generates the second gate low voltage VGL(L) equal to or less than the gate low voltage VGL based on a second reference voltage Vref2 and supplies the second gate low voltage VGL(L) to the selector MUX.

During the touch sensor driving period Tt, the selector MUX alternately outputs the first gate low voltage VGL(H) and the second gate low voltage VGL(L) and produces the AC signal Vac having the same amplitude as the touch driving signal Tdrv. The selector MUX then outputs the AC signal Vac as a low potential power MVSS. On the other hand, the selector MUX outputs the gate low voltage VGL as the low potential power MVSS during the display driving period Td.

To this end, as shown in FIG. 15, the selector MUX includes first to third switches SW1 to SW3, which are selectively turned on in response to a synchronization signal Tsync and an auxiliary control signal PWM_Tx(VGL). In the display driving period Td, the synchronization signal Tsync has a first logic level "1", and the second switch SW2 is turned on and outputs the gate low voltage VGL. In the touch sensor driving period Tt, the synchronization signal Tsync has a second logic level "0," and the first and third switches SW1 and SW3 are selectively turned on in response to the auxiliary control signal PWM_Tx(VGL) in. When the synchronization signal Tsync has the second logic level "0" and the auxiliary control signal PWM_Tx(VGL) has the first logic level "1", the first switch SW1 is turned on and outputs the first gate low voltage VGL(H). When the synchronization signal Tsync has the second logic level "0" and the auxiliary control signal PWM_Tx(VGL) has the second logic level "0", the third switch SW3 is turned on and outputs the second gate low voltage VGL(L).

As described above, the embodiment of the invention applies the AC signal to other input terminals as well as the lower potential input terminal of the gate driver during the touch sensor driving period, thereby removing the influence of a coupling inside the gate driver. Hence, the embodiment of the invention can minimize a distortion of the AC signal supplied to the gate lines.

Furthermore, the embodiment of the invention directly supplies the AC signal to the output terminal of the gate driver through the modulation signal supply line outside the gate driver during the touch sensor driving period without passing through the low potential signal line inside the gate driver, thereby removing the influence of a coupling inside the gate driver. Hence, the embodiment of the invention can minimize a distortion of the AC signal supplied to the gate lines.

Although embodiments have been described with reference to a number of illustrative embodiments thereof, numerous other modifications and embodiments may be devised by those skilled in the art that will fall within the scope of the principles of this disclosure. In particular, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel having touch sensors and gate lines;
a touch sensor driver configured to supply a touch driving signal to the touch sensors of the display panel during a touch sensor driving period;
a gate driver configured to supply a gate pulse synchronized with a data voltage of an input image to the gate lines of the display panel during a display driving period and supply an alternating current (AC) signal having a same phase as the touch driving signal to the gate lines during the touch sensor driving period; and
a modulator configured to supply the AC signal having the same phase as the touch driving signal to a low potential input terminal of the gate driver and to at least one of a high potential input terminal, a clock input terminal, a start input terminal, and a reset input terminal of the gate driver during the touch sensor driving period,
wherein the AC signal includes a first AC signal having a first gate high voltage and a second gate high voltage supplied to the high potential input terminal of the gate driver and a second AC signal having a first gate low voltage and a second gate low voltage supplied to the low potential input terminal, the clock input terminal, the start input terminal, and the reset input terminal of the gate driver,
wherein the first gate high voltage is equal to or greater than a gate high voltage of the display driving period, the second gate high voltage is equal to or less than the gate high voltage of the display driving period, the first gate low voltage is equal to or greater than a gate low voltage of the display driving period, and the second gate low voltage is equal to or less than the gate low voltage of the display driving period, and
wherein an amplitude between the first gate high voltage and the second gate high voltage and an amplitude between the first gate low voltage and the second gate low voltage are equal to an amplitude of the touch driving signal.

2. The display device of claim 1, further comprising:
a plurality of pixels defined by data lines and gate lines, touch sensors, and sensor lines, each pixel including:
a pixel electrode and a pixel thin film transistor (TFT) electrically connected to the pixel electrode, wherein the pixel electrode is configured to receive a data voltage of an input image through the pixel TFT; and
a storage capacitor connected to the pixel electrode;
a display driver configured to supply the data voltage to the pixel, the display driver including a data driver, a gate driver, and a timing controller,
wherein the modulator is configured to supply the AC signal to an output terminal of the gate driver through a modulation signal supply line, wherein the modulation signal supply line is separate from gate stages of the gate driver and the AC signal is a low potential power, and
wherein the output terminal of the gate driver includes an output selector which selectively outputs the gate pulse received from the gate driver and the AC signal received from the modulation signal supply line.

3. A display device comprising:
a display panel having touch sensors and gate lines;
a touch sensor driver configured to supply a touch driving signal to the touch sensors of the display panel during a touch sensor driving period;
a gate driver configured to supply a gate pulse synchronized with a data voltage of an input image to the gate lines of the display panel during a display driving period and supply an alternating current (AC) signal having a same phase as the touch driving signal to the gate lines during the touch sensor driving period; and
a modulator configured to supply the AC signal having the same phase as the touch driving signal to a low potential input terminal of the gate driver and to at least one of a high potential input terminal, a clock input terminal, a start input terminal, and a reset input terminal of the gate driver, during the touch sensor driving period, the modulator comprising:
a first comparator and a second comparator configured to operate in accordance with a first bias voltage;
a first selector connected to the first and second comparators;
a third comparator and a fourth comparator configured to operate in accordance with a second bias voltage; and
a second selector connected to the third and fourth comparators.

4. The display device of claim 3, further comprising:
a plurality of pixels defined by data lines and gate lines, touch sensors, and sensor lines, each pixel including:
a pixel electrode and a pixel thin film transistor (TFT) electrically connected to the pixel electrode, wherein the pixel electrode is configured to receive a data voltage of an input image through the pixel TFT; and
a storage capacitor connected to the pixel electrode;
a display driver configured to supply the data voltage to the pixel, the display driver including a data driver, a gate driver, and a timing controller.

5. A display device comprising:
a display panel having touch sensors and gate lines;
a touch sensor driver configured to supply a touch driving signal to the touch sensors of the display panel during a touch sensor driving period;
a gate driver configured to supply a gate pulse synchronized with a data voltage of an input image to the gate lines of the display panel during a display driving period and supply an alternating current (AC) signal having a same phase as the touch driving signal to the gate lines during the touch sensor driving period; and
a modulator configured to supply the AC signal having the same phase as the touch driving signal to a low potential input terminal of the gate driver and to at least one of a high potential input terminal, a clock input terminal, a start input terminal, and a reset input terminal of the gate driver, during the touch sensor driving period, the modulator comprising:
a first comparator configured to generate the first gate high voltage equal to or greater than a gate high voltage of the display driving period;
a second comparator configured to generate the second gate high voltage equal to or less than the gate high voltage;
a first selector configured to alternately output the first gate high voltage and the second gate high voltage and produce the first AC signal having a same amplitude as the touch driving signal in the touch sensor driving period;

a third comparator configured to generate the first gate low voltage equal to or greater than a gate low voltage of the display driving period;

a fourth comparator configured to generate the second gate low voltage equal to or less than the gate low voltage; and a second selector configured to alternately output the first gate low voltage and the second gate low voltage and produce the second AC signal having a same amplitude as the touch driving signal in the touch sensor driving period.

6. The display device of claim 5, wherein the first comparator generates the first gate high voltage equal to or greater than the gate high voltage based on a first reference voltage and supplies the first gate high voltage to the first selector; and wherein the second comparator generates the second gate high voltage equal to or less than the gate high voltage based on a second reference voltage and supplies the second gate high voltage to the first selector.

7. The display device of claim 6, wherein the first selector includes a first switch, a second switch, and a third switch that are selectively turned on in response to a synchronization signal and a first auxiliary control signal;

wherein in the display driving period, the synchronization signal has a first logic level, and the second switch is turned on and outputs the gate high voltage;

wherein in the touch sensor driving period, the synchronization signal has a second logic level, and the first and third switches are selectively turned on in response to the first auxiliary control signal;

wherein when the synchronization signal has the second logic level and the first auxiliary control signal has the first logic level, the first switch is turned on and outputs the first gate high voltage; and wherein when the synchronization signal has the second logic level and the first auxiliary control signal has the second logic level, the third switch is turned on and outputs the second gate high voltage.

8. The display device of claim 7, wherein the third comparator generates the first gate low voltage to be equal to or greater than the gate low voltage based on a third reference voltage and supplies the first gate low voltage to the second selector, wherein the fourth comparator generates the second gate low voltage to be equal to or less than the gate low voltage based on a fourth reference voltage and supplies the second gate high voltage to the second selector.

9. The display device of claim 8, wherein the second selector includes a fourth switch, a fifth switch, and a sixth switch, which are alternately turned on in response to the synchronization signal and a second auxiliary control signal, wherein in the display driving period, the synchronization signal has a first logic level, and the fifth switched is turned on and outputs the gate low voltage, wherein in the touch sensor driving period, the synchronization signal has a second logic level, and the fourth and sixth switches are selectively turned on in response to the second auxiliary control signal, wherein when the synchronization signal has the second logic level and the second auxiliary control signal has the first logic level, the fourth switch is turned on and outputs the first gate low voltage, wherein when the synchronization signal has the second logic level and the second auxiliary control signal has the second logic level, the sixth switch is turned on and outputs the second gate low voltage.

10. A display device comprising:

a display panel having touch sensors and gate lines;

a touch sensor driver configured to supply a touch driving signal to the touch sensors of the display panel during a touch sensor driving period;

a gate driver configured to supply a gate pulse synchronized with a data voltage of an input image to the gate lines of the display panel during a display driving period and supply an alternating current (AC) signal having a same phase as the touch driving signal to the gate lines during the touch sensor driving period; and a modulator configured to supply the AC signal having the same phase as the touch driving signal to an output terminal of the gate driver through a modulation signal supply line during the touch sensor driving period, wherein the output terminal of the gate driver includes an output selector configured to selectively output the gate pulse received from an output node of the gate driver and the AC signal received from the modulation signal supply line, wherein the AC signal has a first gate low voltage that is equal to or greater than a gate low voltage of the display driving period and a second gate low voltage that is equal to or less than the gate low voltage of the display driving period, and wherein an amplitude between the first gate low voltage and the second gate low voltage is equal to an amplitude of the touch driving signal.

11. The display device of claim 10, wherein the modulator includes:

a first comparator and a second comparator to operate in accordance with a bias voltage; and a selector connected to the first and second comparators.

12. A display device comprising:

a display panel having touch sensors and gate lines;

a touch sensor driver configured to supply a touch driving signal to the touch sensors of the display panel during a touch sensor driving period;

a gate driver configured to supply a gate pulse synchronized with a data voltage of an input image to the gate lines of the display panel during a display driving period and supply an alternating current (AC) signal having a same phase as the touch driving signal to the gate lines during the touch sensor driving period; and a modulator configured to supply the AC signal having the same phase as the touch driving signal to an output terminal of the gate driver through a modulation signal supply line during the touch sensor driving period, the modulator comprising:

a first comparator configured to generate a first gate low voltage equal to or greater than a gate low voltage of the display driving period;

a second comparator configured to generate a second gate low voltage equal to or less than the gate low voltage; and a selector configured to alternately output the first gate low voltage and the second gate low voltage and produce the AC signal having the same amplitude as the touch driving signal in the touch sensor driving period.

13. The display device of claim 12, wherein the first comparator generates the first gate low voltage equal to or greater than the gate low voltage based on a first reference voltage and supplies the first gate low voltage to the selector,
  wherein the second comparator generates the second gate low voltage equal to or less than the gate low voltage based on a second reference voltage and supplies the second gate low voltage to the selector.

14. The display device of claim 13,
  wherein the selector includes a first switch, a second switch, and a third switch, which are selectively turned on in response to a synchronization signal and an auxiliary control signal;
  wherein in the display driving period, the synchronization signal has a first logic level, and the second switch is turned on and outputs the gate low voltage;
  wherein in the touch sensor driving period, the synchronization signal has a second logic level, and the first and third switches are selectively turned on in response to the auxiliary control signal;
  wherein when the synchronization signal has the second logic level and the auxiliary control signal has the first logic level, the first switch is turned on and outputs the first gate low voltage; and
  wherein when the synchronization signal has the second logic level and the auxiliary control signal has the second logic level, the third switch is turned on and outputs the second gate low voltage.

* * * * *